United States Patent [19]

Yukuta et al.

[11] 4,221,875
[45] Sep. 9, 1980

[54] FLAME RESISTANT POLYURETHANE FOAM AND THE METHOD FOR MANUFACTURING THE SAME

[75] Inventors: Toshio Yukuta, Kashio; Takumi Ishiwaka; Noboru Yamaguchi, both of Yokohama, all of Japan

[73] Assignee: Bridgestone Tire Co., Ltd., Tokyo, Japan

[21] Appl. No.: 881,430

[22] Filed: Feb. 27, 1978

[30] Foreign Application Priority Data

Feb. 3, 1977 [JP] Japan ............................ 52-022316

[51] Int. Cl.$^2$ .................. C08G 18/14; C08G 18/32
[52] U.S. Cl. ................................ 521/128; 521/163; 521/906
[58] Field of Search .................. 521/128, 163, 906

[56] References Cited

U.S. PATENT DOCUMENTS

| | | | |
|---|---|---|---|
| 3,399,151 | 8/1968 | Kaiser | 521/166 |
| 3,462,381 | 8/1969 | Eaton et al. | 521/166 |
| 3,824,239 | 7/1974 | Narayan et al. | 521/166 |
| 3,897,372 | 7/1975 | Kehr et al. | 521/128 |
| 4,098,729 | 7/1978 | Kollmeier | 521/128 |
| 4,139,501 | 2/1979 | Rudner et al. | 521/166 |

*Primary Examiner*—H. S. Cockeram
*Attorney, Agent, or Firm*—Kane, Dalsimer, Kane, Sullivan and Kurucz

[57] ABSTRACT

According to the present invention polyurethane foams, can be obtained as flame resistant and non-corrosive product. The invention specifies the foaming of raw material mixture comprising polyhydroxyl compound, polyisocyanate, blowing agent and etc. to be carried out in the presence of melamine powder added thereto as novel flame retardant, the final products being inexpensive and suitable to be used as structural material, etc.

8 Claims, No Drawings

FLAME RESISTANT POLYURETHANE FOAM AND THE METHOD FOR MANUFACTURING THE SAME

BACKGROUND OF THE INVENTION

Hitherto, polyurethane foam, being widely used in various fields and appreciated of its special quality, shows however a gross weak point in its flame-resistance. And yet, the control of flame-resistance of polyurethane foam materials is tending lately to become severe more and more and this situation has brought out a very important problem of how to technically make polyurethane foam flame resistant.

As regards how to make polyurethane foam flame resistant, many kinds of technique have already been proposed. However, the most preferably used one of these techniques is a method of adding, as flame retardants, a phosphorous and halogen containing compound such as tris ($\beta$-chloroethyl) phosphate. In the case of adopting this method, however, it is necessary for conferring flame-resistance on polyurethane foam to add such a great amount of phosphorus containing compound as to make the rate of phosphorus content in the foam higher than about 1%. Thus, it is necessary to add an expensive phosphorus, and halogen containing flame retardants in such a quantity as to amount 10 to 30 parts by weight per 100 parts by weight of polyhydroxyl compound, the polyurethane foam produced proves consequently to be of fairly high cost. Saying about the physical properties of the foam, further, the plasticizing effect of the added phosphorus and halogen containing flame retardants causes the polyurethane foam to be reduced in hardness, decreased in compressive strength and increased in density so that the foam is markedly lowered in the physical properties of matter. Besides, as said conventional type of flame retardant tends, when used at an elevated temperature, to undergo volatilization loss with the passage of time so as to be weakened in its effect, there arising thus a problem of suffering a fatal decrease in the flame resistance. Lately moreover, as it was confirmed an accident due to corrosion progress in a heavy oil tank equipped with a heat insulation construction made up of rigid polyurethane foam that the accident took its rise in a phosphorus and halogen containing flame retardant as one of compounding ingredients of the foam, the suspensive using of conventional flame retardants has created a remarkable stir in the field of construction works of heat insulation.

Since various questions are involved as above-mentioned in using phosphorus and halogen containing compounds as flame retardant, the development of a technique has already been strongly demanded which confers flame resistance to polyurethane foam without using any phosphorus and halogen containing compounds.

The present inventors, concentrating their energies on investigation for replying to the above-mentioned requirement, arrived finally at the discovery of a surprising fact that inexpensive melamine powder can be utilized quite with effect to confer flame resistance on polyurethane foam. The usage of triazine ring containing compounds as one of compounding ingredients for polyurethane foam has already been proposed by way of, for example, Japanese patent laid open No. 141650/75, Japanese patent laid open No. 84844/76 and Japanese patent laid open No. 16461/76. While these well-known arts make use of a triazine ring containing compound as an ingredient of foam to improve the fatigue bearability of polyurethane foam against repeated stress thereon, it has hitherto been quite unknown the fact that melamine powder has an excellent flame resistant effect on polyurethane foam. The present inventors, being based upon this information, added melamine powder to the conventional formulation of rigid polyurethane foam instead of using a phosphorus and halogen containing compounds as flame retardants and thereby succeeded in manufacturing rigid polyurethane foams which have an excellent flame resistance and show only small decrease in the physical properties; their investigation led to the present invention.

SUMMARY OF THE INVENTION

This invention relates to polyurethane foams (flame resistant polyurethane foams) to be used as building material, structural material, heat-insulation material, etc. and also to the method for manufacturing the same. More particularly, the invention relates to flame resistant polyurethane foams prepared by mixing a polyhydroxyl compound and a polyisocyanate with melamine powder as flame retardant and subjecting the mixture to foaming reaction in the presence of blowing agent, the invention relating also to the method of preparing said type of polyurethane foams characterized in that polyurethane foam is conferred with flame resistance by incorporating melamine powder thereinto.

According to the present invention melamine powder is incorporated as flame retardant into polyurethane foam obtained by making a polyhydroxyl compound and polyisocyanate react with each other in the presence of blowing agent. The polyurethane foam thus prepared behaves as excellently flame resistant and as little lowered in the physical properties of matter. Besides, as compared to conventional product of polyurethane foam with expensive and corrosive phosphorus and halogen containing flame retardants the polyurethane foam of this invention can be offered at lower prices owing to the use of inexpensive melamine powder. Hence it is the primary object of the present invention to provide a novel, flame resistant polyurethane foam which is particularly useful because of no tendency to cause corrosion and have lowered prices.

The second object of this invention is to provide a method for easily and inexpensively manufacturing polyurethane foams having excellent flame resistance by mixing a polyhydroxyl compound and polyisocyanate with melamine powder and subjecting the mixture to foaming reaction in the presence of foaming agent.

The present invention will now be described in details in the following:

In this invention, there being no particular qualification as to polyhydroxyl compound, polyisocyanate and blowing agent, they may be any ones which have hitherto been employed in the manufacture of polyurethane foam. Thus, as polyhydroxyl compound, for instance, there may be used, including those polyesters produced by esterification between a polybasic acid such as adipic acid and a polyhydric alcohol, those polyethers produced by addition of an alkylene oxide such as ethylene oxide or propylene oxide to ethylene glycol, glycerol, propylene glycol, diethylenetriamine, aromatic diamines, sucrose, sorbitol and the like and further such compounds as containing two or more hydroxyl groups at molecular end. As polyisocyanate, further, there may be used aromatic isocyanates such as tolylenediisocyanate, diphenylmethanediisocyanate, alicyclic isocyanates such as hydrogenated tolylenediisocyanate, aliphatic isocyanates such as hexamethylenediisocyanate, and etc. As blowing agent, further, there may be used water (carbon dioxide), trichloromonofluoromethane, methylene dichloride, pentane, air, etc.

Above-mentioned polyhydroxyl compounds, polyisocyanate and blowing agent may be employed also in the presence of an amine, a catalyst such as organotin compound, surfactants such as silicone resin and activator added thereto as auxiliary agents which are generally used in the manufacture of polyurethane foam.

Now, according to the present invention above-mentioned ingredients are added with melamine of the formula

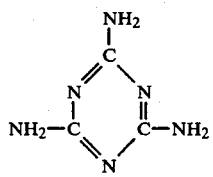

(1)

in powder form as flame retardant. By the addition of melamine powder polyurethane foam can be furnished with an excellent flame resistance. While the quantity of melamine powder added is not particularly qualified, greater quantity of added melamine powder will result in the more excellent flame resistance. In adding said melamine powder, to say further, not only the kind of polyurethane foam raw material is selected but also the quantity of melamine powder added is adjusted according to the degree of flame resistance as well as the physical properties requested because flame resistance of polyurethane foam product, depends subtly upon the kind of polyurethane foam raw material especially upon the chemical structure of polyhydroxyl compound, polyisocyanate and silicone surfactant respectively. For instance, as circumstantially described in comparative examples and examples given hereinafter, when diphenylmethanediisocyanate is used as polyisocyanate and Actocol GR-71 (Takeda Chemicals, commercial name) which is a sort of aromatic amine derivative polyol is used as polyhydroxyl compound, a self-extinguishing polyurethane foam is obtained. When similar aromatic amine derivative Nippolan N-56 (Nihon Polyurethane, commercial name) or Nisso NE-450 (Nihon Soda, commercial name) which is a sort of sucrose derivative polyol is used as polyhydroxyl compound, the polyurethane foam obtained proves inflammable. Further, when the degree of flame resistance demanded of these polyurethane foams is only such an improvement as to make them self-extinguishing, melamine powder is mixed in a small amount (for instance 20 parts by weight per 100 parts by weight of polyhydroxyl compound) and when it is necessary for polyurethane foam to be improved as far as it becomes nonburning, melamine powder is mixed in a comparatively large amount (for instance, 60 parts by weight). Further, when diphenylmethanediisocyanate is used as polyisocyanate, replacement of diphenylmethanediisocyanate with tolylenediisocyanate makes the product, irrespective of using such a formulation receipt as to produce excellent flame resistant effect, turn out inflammable. In such case, however, it is possible by optionally increasing the quantity of melamine powder added for polyurethane foam to become flame resistant. For manufacturing polyurethane foams from polyhydroxyl compound, polyisocyanate and others added with above mentioned melamine powder as flame retardant any method adapted for manufacturing polyurethane foam in general may be employed. There being adopted, for instance, the one-shot process and the prepolymer method, either of low pressure foaming and high pressure foaming will do inclusive of practicability of foaming in place. According to these methods and the use of the product, the formulation is suitably made to foam into rigid, semi-rigid or flexible polyurethane foam products. As regards the way of adding melamine powder no limit being set thereto, it may be used in the form of homogeneous premixture prepared beforehand by mixing with polyhydroxyl compound or as a suspension obtained by adding to polyisocyanate. A method of using the melamine powder as independent ingredient may also be adopted by which the powder is mixed with other ingredients in the step of preparing polyurethane foam so as to make a homogeneous dispersion.

Now, when each raw material for manufacturing prescribed polyurethane foam is mixed together according to routine procedure, polyhydroxyl compound and polyisocyanate react with each other under foaming in the presence of blowing agent and the melamine powder present as dispersed in the reaction mixture behaves so as to produce polyurethane foam as incorporated with melamine powder. The polyurethane foam thus obtained behaves as excellently flame resistant owing to the special flame resistance conferring effect of melamine powder contained therein and can be used with effect for structural material and the like which should have flame resistance.

As described hereinbefore the polyurethane foam manufactured according to the present invention has very excellent flame resistant property on the one hand owing to melamine powder incorporated therein as peculiarly effective in conferring flame resistance on polyurethane foam and shows on the other hand almost no eventual drop in the physical properties due to the addition of melamine powder. Besides, while conventional phosphorus-halogen containing flame retardants is not impossible to be lost through volatilization with the passage of time and thereby lowered in flame resistant effect, foam product of this invention shows no such lowering in its flame resistance and moreover does not undergo corrosion unlike that processed with phosphorus-halogen containing flame retardants. Further, as addition of inexpensive melamine powder serves the purpose, low-priced polyurethane foams behaving as flame resistant can be manufactured with ease.

DESCRIPTION OF PREFERRED EXAMPLES

The present invention will now be explained hereinafter by way of a few examples and comparative examples, these examples setting, however, no limit to this invention.

EXAMPLES 1-14

In accordance with the composition receipt given in Table 1 a polyol was first weighed out by 150 g into a paper cup, added then with the necessary amounts of catalyst, silicone surfactant and water, respectively. After being stired for about 10 seconds by means of propeller type agitator the mixture was added further with the necessary amounts of melamine powder and trichloromonofluoromethane and thoroughly homogenized by stirring for about one minute. When the homogeneous liquid mixture thus obtained was added with the necessary amount of crude diphenylmethanediisocyanate and submitted to high speed agitation, there started reaction and the reaction mixture became creamy generally after about 15 seconds or so. (cream-time) When the reaction mixture in this state was quickly poured into a paper mould of 250×250×200 cm³, it begans to become foamy, the rise of foam being completed after about 150 seconds or so. (rise-time)

Rigid polyurethane foams thus obtained were let alone at room temperature for about one week and submitted thereafter to test of general property of matter and also to burning test, results being obtained as given Table 1.

COMPARATIVE EXAMPLES 1–7

In the same way of foaming as in Examples except leaving out the addition of melamine powder rigid polyurethane foams were prepared according to the formulation recipe of Table 1 and results of testing physical properties and those of burning test were obtained as given in Table 1.

As seen from the result of burning test given in Table 1 the flame resistance of rigid polyurethane foam depends very much on the kind of polyol employed.

Thus, when Actocol GR-71 (Takeda Chemicals, commercial name) which is a kind of aromatic amine derivative polyol is used, the result of burning test judged as self-extinguishing already in Comparative Examples 1 and 2. However, according to Examples 1–4 of the present invention the addition of melamine powder being effective in enhancing the tendency to self-extinguishing (burning distance becomes distinctly shorter), even a judgement for non-burning can thereby obtained rather nearby. In using Nippolan N-506 (Nihon Polyurethane commercial name), on the other hand, which is likewise a sort of aromatic amine derivative polyol, result of burning test was judged for inflammable as indicated by Comparative Examples 3 and 4. Even with rigid polyurethane foam behaving thus as inflammable it is recognized that in Examples 5–9 wherein melamine powder was added according to the present invention improvement was attained as far as self-extinguishing or non-burning. Thus, the degree of flame resistance attained in Example 5 wherein 20 parts of melamine powder was added is nearly equal to that in Comparative Example 5 in which 10 parts of conventional flame retardant TCEP (Tris($\beta$-chloroethyl)Phosphate) was added. As to the case of using Nisso NE-450 (Nihon Soda, commercial name), further, which is a sort of sucrose derivative polyol the merit of this invention to be clearly confirmed by comparing Comparative Examples 6 and 7 with Examples 10–14 in respect of the result of burning test.

All the above-mentioned examples point to the novelty and industrial usefulness of the present invention according to which polyurethane foam is obtained as flame resistant manufacture without using conventional phosphorus and halogen containing flame retardants but by addition of melamine powder quite inexpensive in industrial aspect.

Table 1

| <Formulation> (PHR) | Example | | | | Comparative example | | | |
|---|---|---|---|---|---|---|---|---|
| | 1 | 2 | 3 | 4 | 1 | 2 | 3 | 4 |
| Polyol | | | | | | | | |
| Actocol GR-71[1] | 100 | 100 | | | 100 | 100 | 100 | 100 |
| Nippolan 506[2] | | | | | | | 100 | 100 |
| Nisso NE-450[3] | | | | | | | | |
| Flame retardant | | | | | | | | |
| Melamine powder | 20 | 40 | 60 | 100 | | | | |
| TCEP[4] | | | | | | | 1.5 | 1.5 |
| Catalyst | | | | | | | | |
| DABCO-33LV[5] | | | | | | | | |
| Amino-alcohol 2 M[6] | | | | | | | | |
| C-Cat[7] | 0.8 | 0.8 | 0.8 | 0.8 | 0.8 | 0.8 | | |
| Neostann U-100[8] | | | | | | | 0.17 | 0.17 |
| Surfactant | | | | | | | | |
| Silicone SH-193[9] | | | | | | | | |
| Silicone F-317[10] | 1.5 | 1.5 | 1.5 | 1.5 | 1.5 | 1.5 | | |
| Silicone L-5420[11] | | | | | | | 1.5 | 1.5 |
| Blowing agent | | | | | | | | |
| Water | 1.5 | 1.5 | 1.5 | 1.5 | 1.5 | 1.5 | 2.0 | 2.0 |
| Asahiflon 11SS[12] | 38 | 46 | 54 | 67 | 40 | 32 | 60 | 28.5 |
| Poly-isocyanate | | | | | | | | |
| Millionate MR[13] | 147.0 | 147.0 | 147.0 | 147.0 | 147.0 | 147.0 | 141.2 | 141.2 |
| (NCO Index) | 110 | 110 | 100 | 110 | 110 | 110 | 108 | 108 |
| <Physical properties> | | | | | | | | |

Table 1-continued

| | | | | | | | | |
|---|---|---|---|---|---|---|---|---|
| Foam density (g/cm³) | 0.0261 | 0.0244 | 0.0259 | 0.0248 | 0.0228 | 0.0260 | 0.0212 | 0.0265 |
| Heat conductivity (Kcal/m.hr. °C.) | 0.0174 | 0.0186 | 0.0176 | 0.0201 | 0.0181 | 0.0174 | 0.0204 | 0.0178 |
| Cold dimensional stability (%) −20° C.×24hr | | | | | | | | |
| 11[14] | −0.4 | −0.3 | 0 | −0.4 | −3.7 | 0.1 | −8.8 | −0.5 |
| 1[15] | −2.6 | −0.5 | −0.8 | 0.4 | −23.8 | −0.6 | −27.2 | −2.9 |
| Hot dimensional stability (%) 70° C.×24hr | | | | | | | | |
| 11[14] | −0.6 | −0.6 | −0.6 | −0.9 | −0.5 | −0.4 | −0.9 | −0.3 |
| 1[15] | 1.0 | 1.0 | 1.0 | 1.9 | 1.2 | 1.0 | 7.0 | 0.8 |
| Compressive strength (kg/cm²) | 1.76 | 1.44 | 1.41 | 0.90 | 1.28 | 1.64 | 0.74 | 1.62 |
| Modulus of compressive elasticity (kg/cm²) | 54.9 | 50.7 | 46.9 | 33.1 | 38.6 | 52.2 | 28.9 | 59.3 |
| <Burning test> ASTM D-1692-59T | | | | | | | | |
| Judgment[16] | SE | SE | NB | NB | SE | SE | B | B |
| Burning distance (mm) | 6 | 5 | | | 32 | 36 | 100 | 100 |
| Burning time (sec) | 8 | 13 | | | 20 | 20 | 27 | 23 |

| <Formulation>(PHR) | Example | | | | Comparative example | | |
|---|---|---|---|---|---|---|---|
| | 5 | 6 | 7 | 8 | 5 | 6 | 7 |
| Polyol | | | | | | | |
| Actocol (GR-71[1]) | | | | | | | |
| Nippolan N-506[2] | 100 | 100 | 100 | 100 | 100 | | |
| Nisso NE-450[3] | | | | | | 100 | 100 |
| Flame Retardant | | | | | | | |
| Melamine powder | 20 | 40 | 40 | 60 | 20 | | |
| TCEP[4] | | | | | 10 | | |
| Catalyst | | | | | | | |
| DABCO-33LV[5] | 1.0 | 1.0 | 1.5 | 1.2 | 1.5 | 1.0 | 1.2 |
| Aminoalcohol 2M[6] | | 1.2 | 2.0 | 1.5 | | 1.2 | 1.5 |
| C-Cat[7] | | | | | | | |
| Neostann U-100[8] | 0.15 | | | | 0.17 | | |
| Surfactant | | | | | | | |
| Silicone SH-193[9] | | 1.5 | 2.0 | 1.5 | | 1.5 | 1.5 |
| Silicone F-317[10] | | | | | | | |
| Silicone L-5420[11] | 1.5 | | | | 1.5 | | |
| Blowing agent | | | | | | | |
| Water | 2.0 | 2.0 | 2.0 | 2.0 | 2.0 | 2.0 | 2.0 |
| Asahiflon 11 SS[12] | 60 | 70 | 44 | 78 | 28.5 | 60 | 30 |
| Polyisocyanate | | | | | | | |
| Millionate MR[13] | 144.4 | 144.4 | 144.4 | 144.4 | 141.2 | 155.1 | 155.1 |
| (NCO Index) | 110 | 110 | 110 | 110 | 108 | 110 | 110 |
| <Physical properties> | | | | | | | |
| Foam density (g/cm³) | 0.0214 | 0.0212 | 0.0250 | 0.0213 | 0.0278 | 0.0204 | 0.0273 |
| Heat conductivity (Kcal/m.hr. °C.) | 0.0208 | 0.0229 | 0.0198 | 0.0228 | 0.0175 | 0.0204 | 0.0184 |
| Cold dimensional stability (%) −20° C. × 24 hr | | | | | | | |
| 11[14] | −0.5 | −0.5 | −0.3 | −0.6 | −0.3 | −6.4 | −0.1 |
| 1[15] | −4.6 | 2.6 | −0.3 | 2.7 | −0.6 | −27.5 | −0.5 |
| Hot dimensional | | | | | | | |

Table 1-continued

| stability (%) 70° C. × 24 hr | | | | | | | |
|---|---|---|---|---|---|---|---|
| 1[14] | −1.7 | −1.5 | −0.8 | −2.0 | −0.4 | −1.5 | −0.7 |
| 1[15] | 8.1 | 4.6 | 1.6 | 5.9 | 0.4 | 4.2 | 0.6 |
| Compressive strength (kg/cm$^2$) | 0.67 | 0.73 | 1.41 | 0.61 | 1.48 | 0.97 | 2.24 |
| Modulus of compressive elasticity (kg/cm$^2$) | 25.9 | 30.9 | 52.7 | 26.6 | 60.7 | 33.8 | 72.1 |
| <Burning>ASTM D-1692-59T | | | | | | | |
| Judgment[16] | SE | NB | SE | NB | SE | B | B |
| Burning distance (mm) | 22 | | 4 | | 17 | 100 | 100 |
| Burning time (sec) | 16 | | 15 | | 11 | 27 | 26 |

<Formulation>(PHR)

| | Example | | | | | |
|---|---|---|---|---|---|---|
| | 9 | 10 | 11 | 12 | 13 | 14 |
| Polyol | | | | | | |
| Actocol GR-71[1] | | | | | | |
| Nippolan 506[2] | 100 | | | | | |
| Nisso NE-450[3] | | 100 | 100 | 100 | 100 | 100 |
| Flame retardant | | | | | | |
| Melamine powder | 100 | 20 | 40 | 40 | 60 | 100 |
| TCEP[4] | | | | | | |
| Catalyst | | | | | | |
| DABCO-33LV[5] | 1.5 | 1.0 | 1.0 | 1.5 | 1.0 | 1.5 |
| Aminoalcohol 2M[6] | 2.0 | 1.2 | 1.2 | 1.5 | 1.2 | 2.0 |
| C-Cat[7] | | | | | | |
| NeostannU-100[8] | | | | | | |
| Surfactant | | | | | | |
| Silicone SH-193[9] | 3.0 | 1.5 | 1.5 | 2.0 | 1.5 | 3.0 |
| Silicone F-317[10] | | | | | | |
| Silicone L-5420[11] | | | | | | |
| Blowing agent | | | | | | |
| Water | 2.0 | 2.0 | 2.0 | 2.0 | 2.0 | 2.0 |
| Asahiflon 11SS[12] | 95 | 65 | 70 | 44 | 78 | 95 |
| Polyisocyanate | | | | | | |
| Millionate MR[13] | 144.4 | 155.1 | 155.1 | 155.1 | 155.1 | 155.1 |
| (NCO Index) | 110 | 110 | 110 | 110 | 110 | 110 |
| <Physical Properties> | | | | | | |
| Foam density (g/cm$^3$) | 0.0219 | 0.0212 | 0.0216 | 0.0264 | 0.0218 | 0.0219 |
| Heat conductivity (Kcal/m.hr. °C.) | 0.0219 | 0.0212 | 0.0216 | 0.0186 | 0.0225 | 0.0220 |
| Cold dimensional stability (%) −20° C. × 24 hr | | | | | | |
| 1[14] | −0.3 | −0.3 | −0.3 | 0 | −0.5 | −0.3 |
| 1[15] | 1.7 | 1.5 | 2.4 | −1.5 | 2.1 | 0.8 |
| Hot dimensional stability (%) 70° C.×24 hr | | | | | | |
| 1[14] | −1.3 | −1.4 | −1.6 | −0.9 | −1.6 | −1.6 |
| 1[15] | 8.2 | 5.6 | 5.5 | 2.3 | 5.6 | 6.4 |
| Compressive strength (kg/cm$^2$) | 0.50 | 0.86 | 0.82 | 1.47 | 0.82 | 0.59 |
| Modulus of compressive elasticity (kg/cm$^2$) | 21.9 | 33.2 | 32.5 | 57.6 | 31.0 | 23.6 |
| <Burning test>ASTM D-1692-59T | | | | | | |
| Judgment[16] | NB | SE | SE | NB | NB | NB |
| Burning distance (mm) | | 59 | 11 | | | |
| Burning time | | | | | | |

Table 1-continued

| (sec) | 40 | 12 |

Note:
[1] Commercial name, product of Takeda Chemicals, aromatic amine derivative polyol, OH number=495–465 mg KOH/g polyol
[2] Commercial name, product of Nihon Polyurethane, aromatic amine derivative polyol, OH number=410–390 mg KOH/g polyol
[3] Commercial name, product of Nihon Soda, sucrose derivative polyol, OH number=465–435 mg KOH/g polyol
[4] Tris (β-chloroethyl) phosphate
[5] Commercial name, manufacture of Sankyo Airproducts, triethylendiamine/dipropylene glycol (weight proportion ½)
[6] Commercial name, product of Nihon Nyukazai, dimethyl ethanolamine
[7] Commercial name, product of Kao Sekken, N,N, N', N'-tetramethylpropylendiamine/N, N, N', N'',N'''-pentamethyldiethylenetriamine (weight proportion 7/3)
[8] Commercial name, product of Nitto Kasei, dibutyltindilaurate
[9] Commercial name, product of Tore Silicone, Silicone surfactant
[10] Commercial name, product of Shinetsu Silicone, Silicone surfactant
[11] Commercial name, product of Nihon Unicar, Silicone surfactant
[12] Commercial name, product of Asahi Glass, trichloromonofluoromethane
[13] Commercial name, product of Nihon Polyurethane, crude diphenylmethanediisocyanate
[14] Dimensional stability in the direction of foaming
[15] Dimensional stability in the direction perpendicular to that of foaming
[16] Judgment appraisal
   B: burning
   SE: self-extinguishing
   NB: non-burning

What is claimed is:

1. In a rigid polyurethane foam obtained by reacting a polyhydroxyl compound with a polyisocyanate in the presence of blowing agent, silicone surfactant and catalyst, the improvement, which comprises; employment of hydrophobic polyetherpolyol having two or more hydroxyl groups per molecule as the polyhydroxyl compound and incorporation of 20 to 100 parts by weight of melamine per 100 parts by weight of the polyhydroxyl compound as a sole flame retardant component.

2. The rigid polyurethane foam according to claim 1, wherein the polyetherpolyol is one containing 70 mole % or more propylene oxide.

3. The rigid polyurethane foam according to claim 1, wherein the polyetherpolyol is one produced by addition of an alkylene oxide mixture containing 70 mole % or more propylene oxide to an active hydrogen containing compound selected from the group consisting of ethylene glycol, glycerol, propylene glycol, diethylenetriamine, aromatic diamines, sucrose and sorbitol.

4. The rigid polyurethane foam according to claim 1, wherein the polyisocyanate is one selected from the group consisting of aromatic isocyanates, alicyclic isocyanates and aliphatic isocyanates.

5. In a method of manufacturing a rigid polyurethane foam by reacting a polyhydroxyl compound with a polyisocyanate in the presence of blowing agent, silicone surfactant and catalyst, the improvement, which comprises; employment of a hydrophobic polyetherpolyol having two or more hydroxyl groups per molecule as the polyhydroxyl compound and incorporation of 20 to 100 parts by weight of melamine per 100 parts by weight of the polyhydroxyl as the sole flame retardant component.

6. The method according to claim 5, wherein the polyetherpolyol is one containing 70 mole % or more propylene oxide.

7. The method according to claim 5, wherein the polyetherpolyol is one produced by addition of an alkylene oxide mixture containing 70 mole % or more propylene oxide to an active hydrogen containing compound selected from the group consisting of ethylene glycol, glycerol, propylene glycol, diethylenetriamine, aromatic diamines, sucrose and sorbitol.

8. The method according to claim 5, wherein the polyisocyanate is one selected from the group consisting of aromatic isocyanates, alicyclic isocyanates and aliphatic isocyanates.

* * * * *